US011323948B2

(12) United States Patent
Magadevan

(10) Patent No.: US 11,323,948 B2
(45) Date of Patent: May 3, 2022

(54) DEVICE MANAGEMENT FOR NB-IOT DEVICES

(71) Applicant: T-Mobile USA, Inc., Bellevue, WA (US)

(72) Inventor: Poornima Magadevan, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 81 days.

(21) Appl. No.: 16/219,773

(22) Filed: Dec. 13, 2018

(65) Prior Publication Data

US 2020/0037226 A1   Jan. 30, 2020

Related U.S. Application Data

(60) Provisional application No. 62/702,771, filed on Jul. 24, 2018.

(51) Int. Cl.
*H04W 40/24* (2009.01)
*H04W 36/00* (2009.01)
*H04W 4/80* (2018.01)
*H04W 8/08* (2009.01)
*H04W 80/04* (2009.01)

(52) U.S. Cl.
CPC .......... *H04W 40/248* (2013.01); *H04W 4/80* (2018.02); *H04W 8/08* (2013.01); *H04W 36/0022* (2013.01); *H04W 80/04* (2013.01)

(58) Field of Classification Search
None
See application file for complete search history.

(56) References Cited

U.S. PATENT DOCUMENTS

| 9,781,259 | B1 * | 10/2017 | Kodaypak | H04L 67/303 |
| 10,070,393 | B2 * | 9/2018 | Arzelier | H04W 52/0241 |
| 10,212,639 | B2 * | 2/2019 | Kodaypak | H04W 76/12 |
| 10,237,847 | B2 * | 3/2019 | Jain | H04W 4/02 |

(Continued)

FOREIGN PATENT DOCUMENTS

| WO | 2017032399 A1 | 3/2017 |
| WO | 2017078491 A1 | 5/2017 |

(Continued)

OTHER PUBLICATIONS

GSMA, 'NB-IoT Deployment Guide to Basic Feature set Requirements', Version 2.0, GSM Association, Official Document CLP.28, Apr. 5, 2018. See pp. 10-13, 18-21.

(Continued)

*Primary Examiner* — Gregory B Sefcheck
(74) *Attorney, Agent, or Firm* — Han Santos, PLLC

(57) ABSTRACT

A NarrowBand-Internet of Things (NB-IoT) device is transitioned from using non-Internet Protocol (IP) communication to using IP communication for device management. A service capability server (SCS) of a core network may receive data from an NB-IoT device via non-IP communication. The SCS may send a command to the NB-IoT device via the non-IP communication to trigger the NB-IoT device to transition to using IP communication to communicate with the SCS. Subsequently, the SCS may command the NB-IoT device to perform one or more device management functions via the IP communication.

20 Claims, 7 Drawing Sheets

(56) References Cited

U.S. PATENT DOCUMENTS

| | | | |
|---|---|---|---|
| 10,306,671 B2* | 5/2019 | Li | H04W 74/004 |
| 10,313,883 B2* | 6/2019 | Krishan | H04W 4/70 |
| 10,334,419 B2* | 6/2019 | Aravamudhan | H04W 76/11 |
| 10,433,129 B2* | 10/2019 | Gupta | H04L 41/082 |
| 10,484,844 B2* | 11/2019 | Sudarsan | H04W 88/184 |
| 10,499,189 B2* | 12/2019 | Fontaine | H04W 4/023 |
| 10,499,306 B2* | 12/2019 | Livanos | H04W 28/08 |
| 10,595,188 B2* | 3/2020 | Ryu | H04W 76/28 |
| 10,616,936 B2* | 4/2020 | Velev | H04W 24/08 |
| 10,631,266 B2* | 4/2020 | Park | H04W 68/02 |
| 10,631,319 B2* | 4/2020 | Li | H04W 4/70 |
| 10,687,354 B2* | 6/2020 | Li | H04W 56/0045 |
| 10,721,612 B2* | 7/2020 | Ryu | H04W 76/32 |
| 10,721,675 B2* | 7/2020 | Jain | H04W 24/02 |
| 10,805,036 B2* | 10/2020 | Ronneke | H04W 4/70 |
| 10,805,178 B2* | 10/2020 | Livanos | H04L 67/26 |
| 10,827,344 B2* | 11/2020 | Gupta | H04W 60/00 |
| 10,849,028 B2* | 11/2020 | Kim | H04W 48/12 |
| 10,856,134 B2* | 12/2020 | Palnati | H04W 76/11 |
| 10,911,936 B2* | 2/2021 | Suzuki | H04W 8/08 |
| 10,972,913 B2* | 4/2021 | Kim | H04W 4/90 |
| 11,115,842 B2* | 9/2021 | Foti | H04W 24/04 |
| 11,134,432 B2* | 9/2021 | Ioffe | H04W 74/0833 |
| 2017/0257843 A1 | 9/2017 | Wang et al. | |
| 2018/0049156 A1* | 2/2018 | Laha | H04W 76/28 |
| 2018/0212710 A1* | 7/2018 | Ronneke | H04L 1/0002 |
| 2018/0219981 A1* | 8/2018 | Backman | H04L 69/321 |
| 2018/0324671 A1* | 11/2018 | Palnati | G06F 9/547 |
| 2018/0352593 A1* | 12/2018 | Velev | H04W 24/08 |
| 2019/0007329 A1* | 1/2019 | Velev | H04L 47/266 |
| 2019/0014530 A1* | 1/2019 | Aghili | H04W 48/08 |
| 2019/0037441 A1* | 1/2019 | Liu | H04W 4/70 |
| 2019/0090122 A1* | 3/2019 | Palnati | H04W 4/70 |
| 2019/0110241 A1* | 4/2019 | Jain | H04L 1/08 |
| 2019/0116483 A1* | 4/2019 | Ryu | H04W 60/04 |
| 2019/0141563 A1* | 5/2019 | Ianev | H04W 28/065 |
| 2019/0166016 A1* | 5/2019 | Livanos | H04W 60/04 |
| 2019/0253870 A1* | 8/2019 | Ronneke | H04W 4/70 |
| 2019/0364420 A1* | 11/2019 | Rommer | H04L 67/14 |
| 2020/0029249 A1* | 1/2020 | Livanos | H04W 28/24 |
| 2020/0037226 A1* | 1/2020 | Magadevan | H04W 4/80 |
| 2020/0153651 A1* | 5/2020 | Wang | H04L 29/08 |
| 2020/0236723 A1* | 7/2020 | Velev | H04L 67/12 |
| 2020/0280865 A1* | 9/2020 | Foti | H04W 4/70 |

FOREIGN PATENT DOCUMENTS

| | | |
|---|---|---|
| WO | 2017133297 A1 | 8/2017 |
| WO | 2018063763 A1 | 4/2018 |

OTHER PUBLICATIONS

PCT Patent Application No. PCT/US2019/041883, International Search Report and Written Opinion dated Oct. 29, 2019, 11 pages.

GSM Association (GSMA), "LTE-M Deployment Guide to Basic Feature Set Requirements," Version 2.0, Apr. 2018, Retrieved from URL: https://www.gsma.com/iot/wp-content/uploads/2018/04/LTE-M_Deployment_Guide_v2_5Apr2018.pdf, 33 pgs.

* cited by examiner

DEVICE MANAGEMENT FOR NB-IOT DEVICES

CROSS REFERENCE TO RELATED PATENT APPLICATION

This application claims priority to U.S. Provisional Patent Application No. 62/702,771, filed on Jul. 24, 2018, entitled "Device Management For NB-IoT Devices," which is hereby incorporated by reference in its entirety.

BACKGROUND

NarrowBand-Internet of Things (NB-IoT) technology is based on Low Power Wide Area Network (LPWAN) communication standards developed by the $3^{rd}$ Generation Partnership Project (3GPP) to provide wireless communication services to NB-IoT devices. An NB-IoT device, also referred to as a resource-constrained device, often has limited data processing capabilities, limited data storage capacity, and limited energy reserve in the form of a battery. For example, an NB-IoT may be a mobile sensor that operates predominately in sleep mode. However, the sensor may wake up once every few hours to send small packets of sensor data to an application server. In order to support these resource-constrained devices, NB-IoT technology introduces non-Internet Protocol (IP) communication over a control plane, in which data may be sent over the control plane of a wireless communication session without the use of IP data packet headers.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
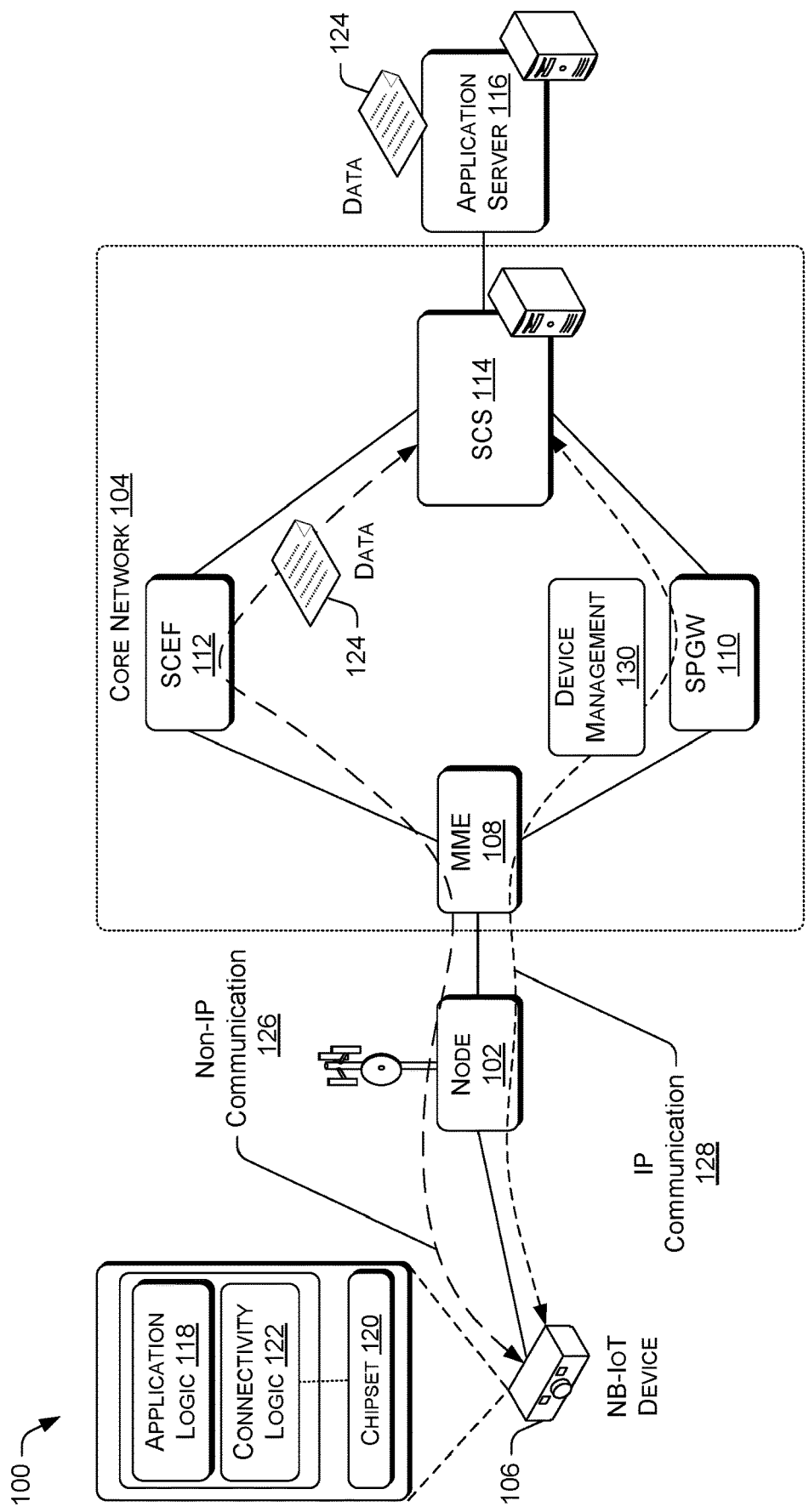
FIG. 1 illustrates an example wireless carrier network architecture for implementing device management of NB-IoT devices.

This disclosure is directed to techniques for switching a NarrowBand-Internet of Things (NB-IoT) device between using non-Internet Protocol (IP) communication and IP communication to provide device management for the NB-IoT device. The NB-IoT device, also referred to as a resource-constrained device, may have limited data processing capabilities, limited data storage capacity, and limited energy reserve in the form of a battery. For example, the NB-IoT device may be a mobile sensor that operates predominately in sleep mode. However, the sensor may wake up once every few hours to send small packets of sensor data to an application server. Non-IP communication refers to communication that conforms to the NB-IoT standards, in which data may be sent over the control plane of a wireless communication session supported by a wireless carrier network without the use of IP defined data packet structures that include IP data packet headers. In contrast, IP communication refers to communication support by the wireless carrier network that conforms to a communication protocol known as IP, such as Internet Protocol Version 4 (IPv4) or Internet Protocol Version 6 (IPv6). In IP-based communication, data are exchanged between network entities using IP defined data packet structures that include IP data packet headers. The device management of the NB-IoT device may be performed by a Service Capability Server (SCS) that resides in a core network of the wireless carrier network. The device management may include changing a network gateway (e.g., Access Point Name (APN)) setting of the NB-IoT device, changing a number of times that the device uploads data to an application server in a predetermined time period, changing a duration of a device sleep cycle, and/or so forth.

The use of non-IP communication, rather than IP communication, prolongs the operational endurance of NB-IoT devices. For example, IP communication that conforms to IPv4 or IPv6 requires each data packet that is sent and received by a device to have an IP data packet header. The IP data packet header may have a size that ranges between 40-128 bytes. In contrast, the data that is exchanged between the NB-IoT device and the application server may be only several bytes in size. This means that IP communication places a significant energy and processing overhead on the device during establishment and maintenance of the IP communication. In contrast, because non-IP communication enables data to be sent over the control plane of a wireless communication session without the use of IP data packet headers, such energy consumption and processing overheads may be reduced or eliminated. As a result, even though an NB-IoT device may have a chipset that supports both non-IP communication and IP communication, the NB-IoT device may be configured by default to use non-IP communication to communicate with a wireless carrier network. For example, the mobile sensor may use non-IP communication provided by the wireless carrier network to send sensor data to an application server. However, the current Open Mobile Alliance (OMA) Lightweight M2M (LWM2M) protocol that governs non-IP communication for NB-IoT devices does not support device management communication.

Accordingly, in order to perform device management, the SCS of the wireless carrier network may switch an NB-IoT device from using non-IP communication to using IP communication to communicate with the wireless carrier network. Once the NB-IoT device is using IP communication, the core network of the wireless carrier network may use IP communication to command the NB-IoT device to perform device management functions. Once the device management is complete, the SCS of the wireless carrier network may switch the NB-IoT device back to using non-IP communication.

In other embodiments, the SCS of the wireless carrier network may direct the NB-IoT device to switch between using an NB-IoT communication connection with the wireless carrier network and using a communication connection established using wireless communication of an alternative standard connection with the wireless carrier network. In such embodiments, the connection established using the wireless communication of the alternative standard may be an LTE communication connection, a 5G communication connection, a 4G communication connection, a 3G communication connection, a 2G communication connection, or a communication connection that conforms to some other communication standard.

The ability for a wireless carrier network to direct an NB-IoT device to switch between using non-IP communication and IP communication may maximize the operational endurance of the NB-IoT device. By switching between using non-IP communication and IP communication, the NB-IoT device may minimize battery consumption and increase the longevity of the device components without compromising the ability of the wireless carrier network to initiate remote management of the device. The techniques described herein may be implemented in a number of ways. Example implementations are provided below with reference to the following figures.

Example Network Architecture

FIG. 1 illustrates an example network architecture of a wireless carrier network for implementing a device management for NB-IoT devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), NB-IoT, and/or so forth.

The network architecture 100 of a wireless carrier network may include base station nodes, such as a base station node 102, and a core network 104. The base station nodes are responsible for handling voice and data traffic between user devices and the core network 104 via air interfaces. Each node may include a base transceiver system (BTS) that communicates via an antennae system over an air-link with one or more user devices that are within range. The core network 104 may provide telecommunication and data communication services to multiple user devices, including an NB-IoT device 106. Other examples of user devices may include a smartphone, a tablet computer, an embedded computer system, or any other device that is capable of using the wireless communication services that are provided by the wireless carrier network. The core network 104 may include components that support 2G and 3G voice traffic, as well as 3G, 4G, and 5G data traffic. For example, 3G data traffic between a user device and the Internet may be routed through a gateway of a 3G Packet Switch (PS) Core. On the other hand, 3G voice traffic between the user device and a Public Switched Telephone Network (PSTN) may be routed through a Mobile Switch (MSC) of a 3G Circuit Switch (CS) core. The core network 104 may further include components that support 4G and 5G voice and data traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. However, for the purpose of illustration clarity, these components are not shown in FIG. 1.

The switching of the NB-IoT device 106 between using non-IP communication and IP communication with the wireless carrier network involves operations by several additional components of the core network 104. These components may include a Mobility Management Entity (MME) 108, a Servicing Gateway/PDN Gateway (SPGW) 110, a Service Capability Exposure Function (SCEF) 112, and the SCS 114. The MME 108 is a part of the EPC that handles paging, authentication, and registration of user devices, as well as the routing of data and voice communications through selected gateways, such as the SPGW 110. The SPGW 110 is a combined LTE serving gateway and LTE Packet Data Network (PDN) gateway that supports GPRS Tunneling Protocol (GTP)-based non-roaming and roaming architectures, and control plane and data plane functions for 3GPP networks. The SCEF 112 is an interface for small data transfers and control messaging between IoT application servers, such as an application server 116, and the core network 104. For example, the SCEF 112 may support Non-IP Data Delivery (NIDD) from the NB-IoT device 106 to the application server 116. The SCS 114 is a backend server of the core network 104 that provides for the management of NB-IoT devices, such as the NB-IoT device 106. Further, the SCS 114 may connect the core network 104 to IoT application servers (e.g., the application server 116), such that they may communicate via 3GPP defined services.

The NB-IoT device 106 may be equipped with an application logic 118 and a chipset 120. The application logic 118 may perform specific predetermined tasks using hardware components of the NB-IoT device 106. For example, the application logic 118 may be configured to periodically obtain an environmental reading from a hardware sensor of the device and report the reading to the application server 116. In another example, the application may be configured to periodically obtain a geolocation reading from a global positioning system (GPS) module and report the reading to the application server 116.

The chipset 120 may include communication hardware components that enable the NB-IoT device 106 to communicate with multiple communication networks using different communication spectrums and/or standards. For example, the communication hardware components may include processors, modems, antennae, and/or so forth. The modems may support the sending and receiving of voice and data traffic through various communication standards, such as NB-IoT, LTE, 5G, 4G, 3G, 2G, etc. The chipset 120 may further include a connectivity logic 122 that encodes and routes data to the multiple communication networks via the communication hardware components. Accordingly, the connectivity logic 122 may switch the NB-IoT device 106 between using Non-IP communication and IP communication. Alternatively, the connectivity logic 122 may switch the NB-IoT device 106 between using an NB-IoT communication connection and a communication connection established using wireless communication of an alternative standard.

In operation, the NB-IoT device 106 may send packets of data 124 to the application server 116 via non-IP communication 126. The data 124 may include data that is generated by the application logic 118 of the NB-IoT device 106. The non-IP communication 126 is routed between the NB-IoT device 106 and the application server 116 via the base station node 102, the MME 108, the SCEF 112, and the SCS 114. However, when the SCS 114 determines that a device management function is to be performed for the NB-IoT device 106, the SCS 114 may command the connectivity logic 122 of the device to switch to performing IP-based communication with the core network 104. Accordingly, the NB-IoT device 106 may establish IP communication 128 with the SCS 114. The IP communication 128 is routed between the NB-IoT device 106 and the SCS 114 via the base station node 102, the MME 108, and the SPGW 110. Subsequently, the SCS 114 may use the IP communication 128 to perform device management 130 for the NB-IoT device 106.

In various embodiments, the SCS 114 may use the IP communication 128 to send device management commands to the NB-IoT device 106. For example, a device management command may cause the NB-IoT device 106 to change an APN setting of the device, change a number of times that the device uploads data to the application server 116 in a predetermined time period, or change a duration of a device sleep cycle. The NB-IoT device 106 may send a completion notification to the SCS 114 via the IP communication 128 following the execution of one or more device management commands. In turn, the completion notification may prompt the SCS 114 to command the connectivity logic 122 of the NB-IoT device 106 to transition back to using the non-IP communication 126.

Example Protocol Sequences

Figure 2:
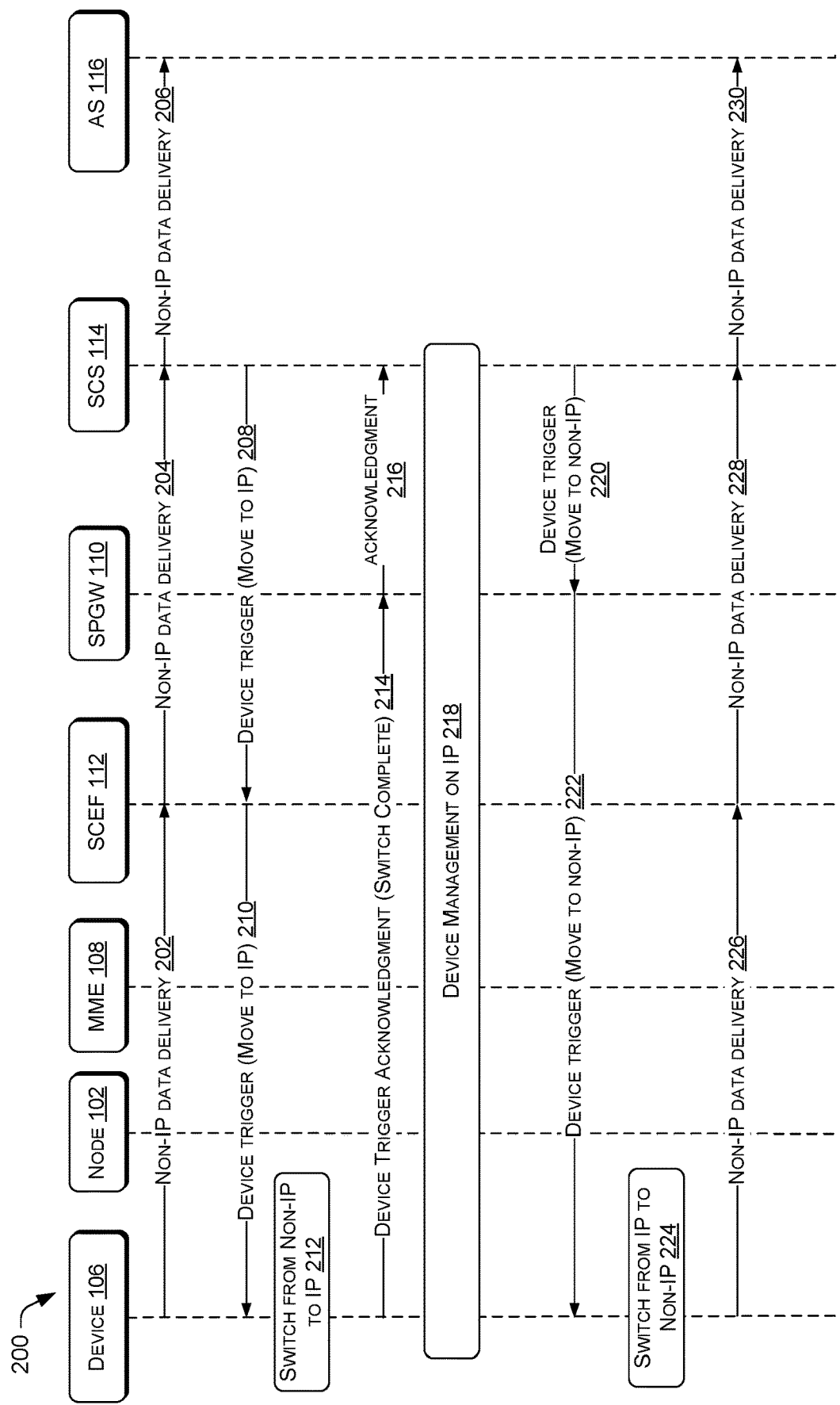
FIG. 2 is a diagram that shows a protocol sequence of a system for switching an NB-IoT device between using non-IP communication and IP communication to provide device management for the NB-IoT device.

FIG. 2 is a diagram that shows a protocol sequence 200 of a system for switching an NB-IoT device between using non-IP communication and IP communication to provide device management for the NB-IoT device. The protocol sequence 200 may be performed by the NB-IoT device 106, the MME 108, the SPGW 110, the SCEF 112, and the application server 116.

At 202, the NB-IoT device 106 may deliver the data 124 to the SCEF 112 by routing the data 124 through the base station node 102 and the MME 108. At 204, the data 124 may be forwarded by the SCEF 112 to the SCS 114. At 206, the SCS 114 may forward the data 124 to the application server 116. Collectively, 202-206 of the protocol sequence 200 constitute NIDD through the non-IP communication 126 between the NB-IoT device 106 and the application server 116.

At 208, the SCS 114 may send a device trigger message to the SCEF 112 to initiate a transition of the NB-IoT device 106 from using the non-IP communication 126 to using the IP communication 128. In some implementations, the device trigger message may be a PDN type message specifying that the NB-IoT device 106 is to use an IP-based communication connection. At 210, the SCEF 112 may forward the device trigger message to the NB-IoT device 106 via the non-IP communication 126 that routes through the MME 108 and the base station node 102. At 212, the NB-IoT device 106 may perform a switch from using the non-IP communication 126 to the IP communication 128. In various embodiments, the establishment of the IP communication 128 may include the NB-IoT device 106 terminating the non-IP communication 126. The NB-IoT device 106 may also register with the core network 104 to obtain an IP address from the core network 104. The IP address is then used by the core network 104 to communicate with the NB-IoT device 106.

At 214, the NB-IoT device 106 may use the newly established IP communication 128 to send a device trigger acknowledgment to the SPGW 110. The IP communication 128 may be routed between the NB-IoT device 106 and the SPGW 110 via the base station node 102 and the MME 108. The device trigger acknowledgment indicates that the switch from the non-IP communication 126 to the IP communication 128 is complete. At 216, the SPGW 110 may forward the device trigger acknowledgment to the SCS 114.

At 218, the SCS 114 may use the IP communication 128 to perform device management 130 of the NB-IoT device 106. The SCS 114 may send one or more device management commands to the NB-IoT device 106 via the IP communication 128. In turn, the NB-IoT device 106 may perform one or more device management functions in response to the device management commands. Subsequently, the NB-IoT device 106 may send acknowledgments and/or command completion notifications to the SCS 114. Accordingly, the SCS 114 may determine based on the acknowledgments and/or notifications that the device management 130 is complete. At 220, the SCS 114 may send a device trigger message to the SPGW 110 to initiate a transition of the NB-IoT device 106 from using the IP communication 128 to using the non-IP communication 126. In some implementations, the device trigger message may be a PDN type message specifying that the NB-IoT device 106 is to use a non-IP-based communication connection. At 222, the SPGW 110 may forward the device trigger message to the NB-IoT device 106 via the IP communication 128. At 224, the NB-IoT device 106 may perform a transition from using the IP communication 128 to using the non-IP communication 126.

At 226, the NB-IoT device 106 may once again deliver the data 124 to the SCEF 112 via the base station node 102 and the MME 108. At 228, the data 124 may be forwarded by the SCEF 112 to the SCS 114. At 230, the SCS 114 may forward the data 124 to the application server 116. Once again, 226-230 of the protocol sequence 200 constitute NIDD through the non-IP communication 126 between the NB-IoT device 106 and the application server 116.

Figure 3:
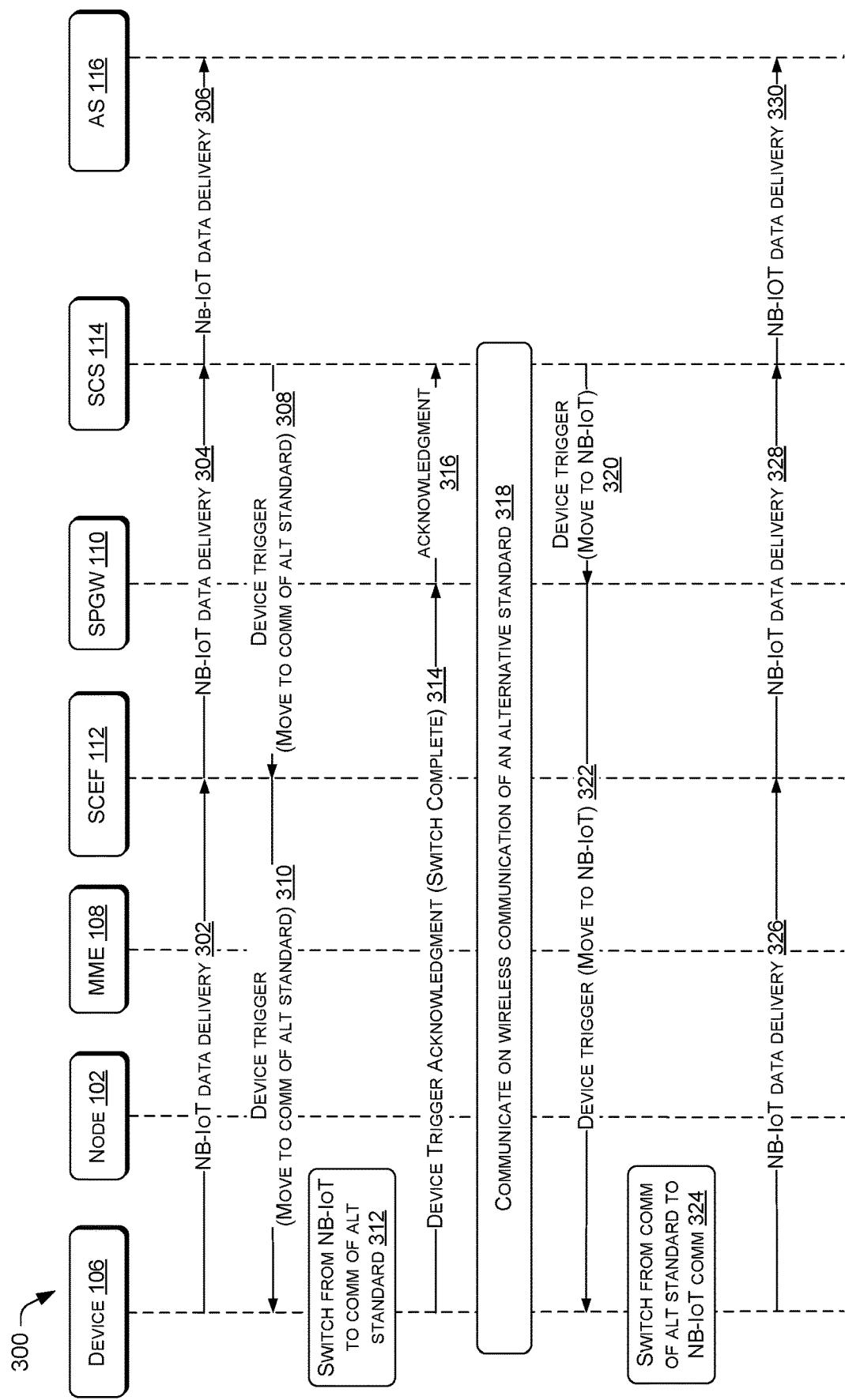
FIG. 3 is a diagram that shows a protocol sequence of a system for switching an NB-IoT device between using NB-IoT communication and wireless communication of an alternative standard.

FIG. 3 is a diagram that shows a protocol sequence 300 of a system for switching an NB-IoT device between using NB-IoT communication and wireless communication of an alternative standard. The alternative wireless communication standard may be LTE, 5G, 4G, 3G, 2G, or some other communication standard. Since the NB-IoT communication provides low data throughput, the switch to the wireless communication of the alternative standard may provide the NB-IoT device with the ability to exchange data with another device or a server at a higher data throughput. The protocol sequence 300 may be performed by the NB-IoT device 106, the base station node 102, the MME 108, the SPGW 110, the SCEF 112, and the application server 116.

At 302, the NB-IoT device 106 may deliver the data 124 to the SCEF 112 by routing the data 124 through the base station node 102 and the MME 108. At 304, the data 124 may be forwarded by the SCEF 112 to the SCS 114. At 306, the SCS 114 may forward the data 124 to the application server 116. Collectively, 302-306 of the protocol sequence 300 constitute NIDD through NB-IoT communication, also referred to as non-IP communication 126.

At 308, the SCS 114 may send a device trigger message to the SCEF 112 to initiate a transition of the NB-IoT device 106 from using NB-IoT communication to using wireless communication of the alternative standard. In some implementations, the device trigger message may be a PDN type message that specifies the wireless communication of the alternative standard. At 310, the SCEF 112 may forward the device trigger message to the NB-IoT device 106 via the NB-IoT communication that routes through the MME 108 and the base station node 102. At 312, the NB-IoT device 106 may perform a transition from using the NB-IoT communication to using the wireless communication of the alternative standard. In various embodiments, the use of the wireless communication of the alternative standard may include the NB-IoT device 106 terminating the NB-IoT Communication. The NB-IoT device 106 may also register with the core network 104 to obtain an IP address from the core network 104. The IP address is then used by the core network 104 to communicate with the NB-IoT device 106. In some instances, the switch to the use of the wireless communication of the alternative standard may involve the NB-IoT device 106 deactivating a first transceiver and activating a second transceiver.

At 314, the NB-IoT device 106 may use the wireless communication of the alternative standard to send a device trigger acknowledgment to the SPGW 110. The wireless communication of the alternative standard may be routed between the NB-IoT device 106 and the SPGW 110 via the base station node 102 and the MME 108. The device trigger acknowledgment indicates that the switch from the NB-IoT communication to the wireless communication of the alternative standard is complete. At 316, the SPGW 110 may forward the device trigger acknowledgment to the SCS 114.

At 318, the core network 104 may use the wireless communication of the alternative standard to communicate with the NB-IoT device 106. The core network 104 may use the wireless communication of the alternative standard to upload data from the NB-IoT device 106 or download data to the NB-IoT device 106. For example, the downloaded data may include operating system updates, new device drivers, new application logic, new connectivity logic, and/or so forth, for the NB-IoT device 106. In some instances, the core network 104 may use the wireless communication of the alternative standard to perform device management of the NB-IoT device 106.

At 320, the SCS 114 may send a device trigger message to the SPGW 110 to initiate a transition of the NB-IoT device 106 from using the wireless communication of the alternative standard to using the NB-IoT communication. In some implementations, the device trigger message may be a PDN type message specifying that the NB-IoT device 106 is to use the NB-IoT communication. At 322, the SPGW 110 may forward the device trigger message to the NB-IoT device 106 via the wireless communication of the alternative standard that routes through the MME 108 and the base station node 102. At 324, the NB-IoT device 106 may perform a switch from using the wireless communication of the alternative standard to using the NB-IoT communication.

At 326, the NB-IoT device 106 may once again deliver the data 124 to the SCEF 112 via the base station node 102 and the MME 108. At 328, the data 124 may be forwarded by the SCEF 112 to the SCS 114. At 330, the SCS 114 may forward the data 124 to the application server 116. Once again, 326-330 of the protocol sequence 300 constitute NIDD through the NB-IoT communication between the NB-IoT device 106 and the application server 116.

Example Resource Constrained Device Components

Figure 4:
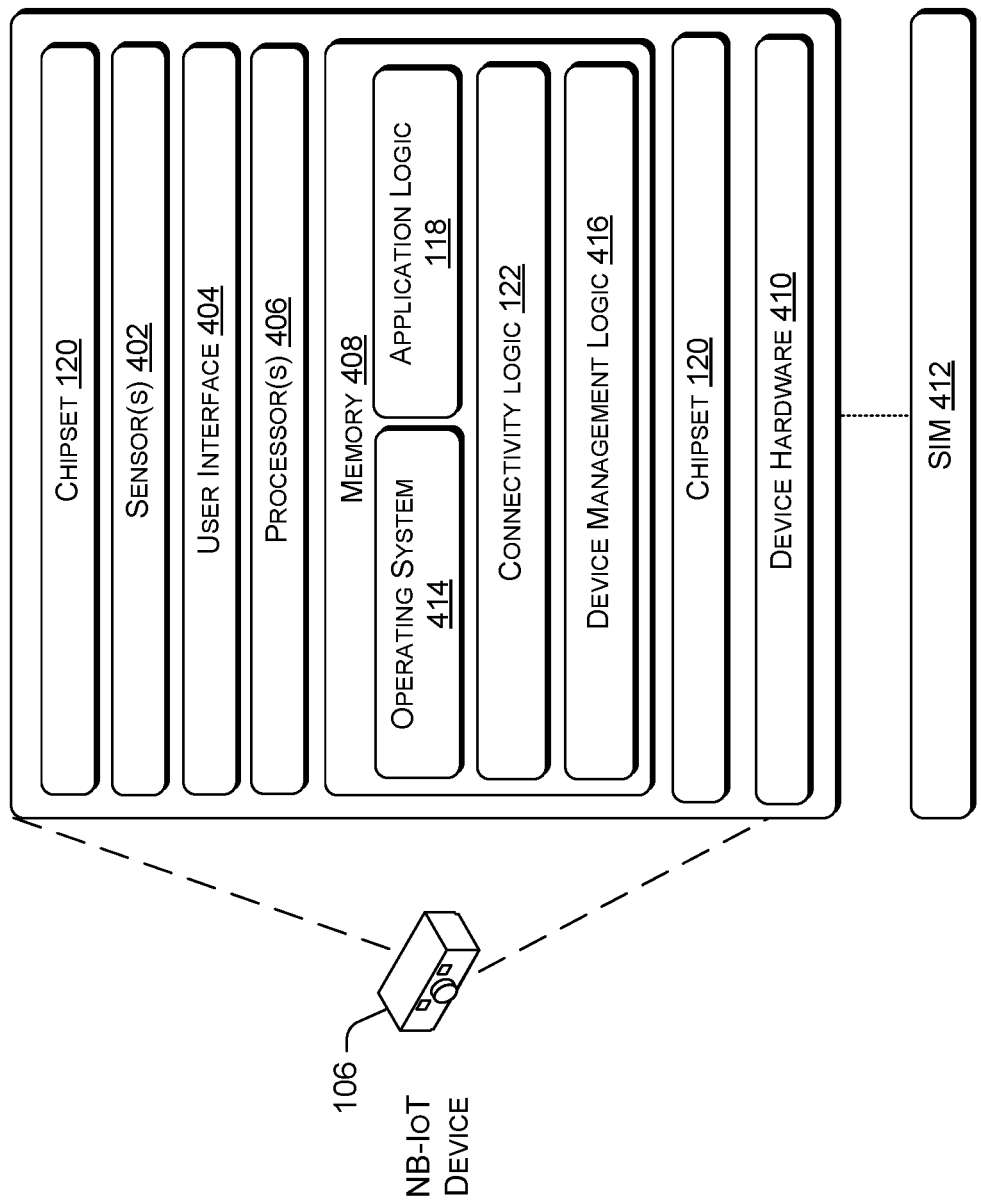
FIG. 4 is a block diagram showing various components of an NB-IoT device that is managed by a core network of a wireless carrier network.

FIG. 4 is a block diagram showing various components of an NB-IoT device that is managed by a core network of a wireless carrier network. The NB-IoT device 106 may include one or more sensors 402, a user interface 404, one or more processors 406, memory 408, a chipset 120, and additional device hardware 410. The sensors 204 may include a proximity sensor, a compass, an accelerometer, altimeter, cameras, a global positioning system (GPS) sensor, or other sensors that sense environmental conditions. For example, the proximity sensor may detect movement of objects that are proximate to the NB-IoT device 106. The compass, the accelerometer, and the GPS sensor may detect orientation, movement, and geolocation of the NB-IoT device 106.

The user interface 404 may enable a user to provide inputs and receive outputs from the NB-IoT device 106. In some instances, the user interface 404 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. However, in other embodiments, due to the nature of the NB-IoT device 106, the user interface 404 may be a simplified interface that includes a power switch, a power indicator, and/or a network connectivity status indicator.

The memory 408 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 410 may include other hardware that is typically located in a mobile telecommunication device. For example, the device hardware 214 may include signal converters, transceivers, antennas, hardware decoders and encoders, graphics processors, a SIM 412, and/or the like that enable the NB-IoT device 106 to execute applications and use telecommunication and data communication functions. The SIM 412 may be an integrated circuit chip that is inserted into the SIM card slot of the NB-IoT device 106, or an embedded SIM that is hardwired into the circuit board of the NB-IoT device 106.

The one or more processors 406 and the memory 408 of the NB-IoT device 106 may implement an operating system 414, the application logic 118, and the connectivity logic 122, and/or additional software. The various software may include routines, program instructions, objects, and/or data structures that are executable by the processors 406 to perform particular tasks or implement particular abstract data types. For example, the additional software may include basic input/output system (BIOS), Boot ROM, or a bootloader that boots up the NB-IoT device 106 and executes an operating system 414 following power-up of the device. The operating system 414 may include components that enable the NB-IoT device 106 to receive and transmit data via various interfaces. The operating system 414 may also process data using the one or more processors 406 to generate outputs based on inputs that are received via the user interface 404. For example, the operating system 414 may provide an execution environment for the execution of the application logic 118 and/or the connectivity logic 122. The operating system 414 may include a presentation component that presents the output (e.g., display the data on an electronic display, store the data in memory, transmit the data to another electronic device, etc.).

The application logic 118 may perform specific predetermined tasks using hardware components of the NB-IoT device 106. For example, the application logic 118 may be configured to periodically obtain an environmental reading from a hardware sensor of the device and report the reading to the application server 116. In another example, the application may be configured to periodically obtain a geolocation reading from a global positioning system (GPS) module and report the reading to the application server 116.

The connectivity logic 122 may switch the NB-IoT device 106 between using Non-IP communication and IP communication. Alternatively, the connectivity logic 122 may switch the NB-IoT device 106 between using an NB-IoT communication connection and a communication connection established using wireless communication of an alternative standard. Accordingly, the connectivity logic 122 may include an NB-IoT protocol stack, an IP Multimedia Subsystem (IMS) protocol stack, an Evolved Packet Data Gateway (ePDG) function, and/or other network connectivity algorithms. The device management logic 416 may include software that perform device management functions in response to commands from the core network 104. Such device management software may power on and off modems that provide communication functions according to different communication standards, as well as trigger corresponding modem software to establish and maintain network communication connections. The device management logic 416 may further program the various sensors 402 and the device hardware 410 to power on, power off, entering into low power (sleep) mode, wake up from the low power mode, and/or perform other functions at different time intervals.

Example Service Capabilities Server Components

Figure 5:
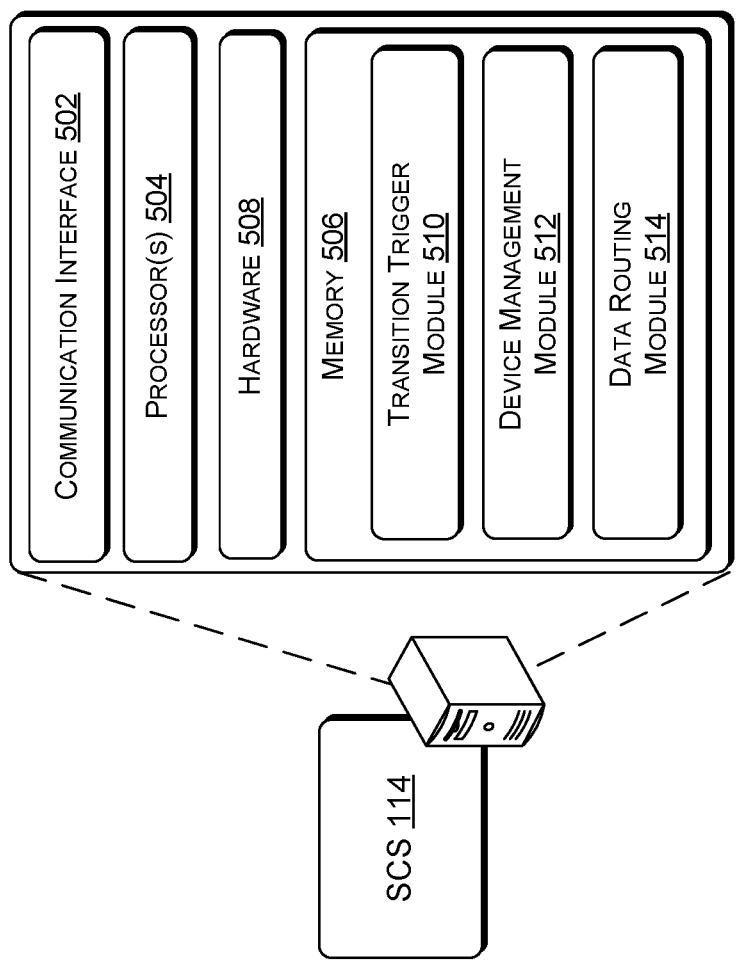
FIG. 5 is a block diagram showing various components of a server that provides device management to NB-IoT devices.

FIG. 5 is a block diagram showing various components of a server that provides device management to NB-IoT devices. The SCS 114 may include a communication interface 502, one or more processors 504, and memory 506. The communication interface 502 may include wireless and/or wired communication components that enable the SCS 114 to transmit data to and receive data from other networked devices. The SCS 114 may be accessed via hardware 508. The hardware 508 may include user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 506 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The memory 506 may store a transition trigger module 510, a device management module 512, and a data routing module 514. The modules may include routines, program instructions, objects, and/or data structures that are executable by the processors 504 to perform particular tasks or implement particular abstract data types. The transition trigger module 510 may interface with the connectivity logic (e.g., the connectivity logic 122) of an NB-IoT device to trigger the device to switch between performing non-IP communication and IP communication, or trigger the device to switch between performing NB-IoT communication or wireless communication of an alternative standard. In various embodiments, the transition trigger module 510 may trigger the transitions via device trigger messages that are sent to the SPGW 110 or the SCEF 112 of the core network 104.

The device management module 512 may command a device management logic (e.g., the device management logic 416) of an NB-IoT device to perform device management functions. The device management function commands that are sent by the device management module 512 are transmitted via non-IP communication to the NB-IoT device. The data routing module 514 may route the data (e.g., the data 124) that are received from the NB-IoT devices (e.g., NB-IoT device 106) to a corresponding IoT application server, such as the application server 116. In various embodiments, the data that is transmitted by an NB-IoT device may be tagged with routing data that identifies a recipient IoT application server. For example, the routing data may include a server name, a server IP address, a server media access control (MAC) address, or some other server identifier. Accordingly, the data routing module 514 may route the data to the recipient IoT application server based on the routing data.

Example Processes

Figure 6:
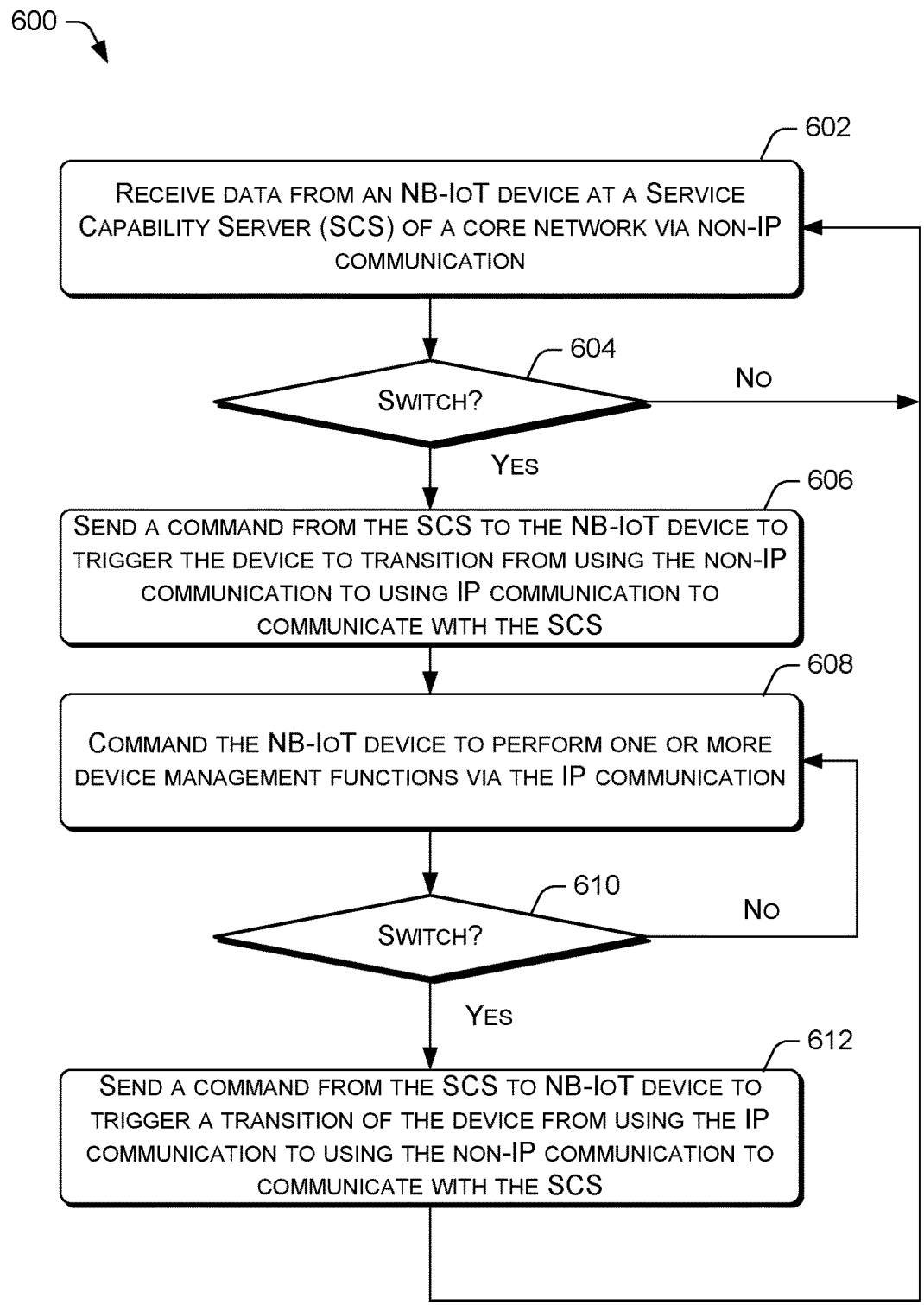
FIG. 6 is a flow diagram of an example process for switching an NB-IoT device between using non-IP communication and IP communication to provide device management for the NB-IoT device.
Figure 7:
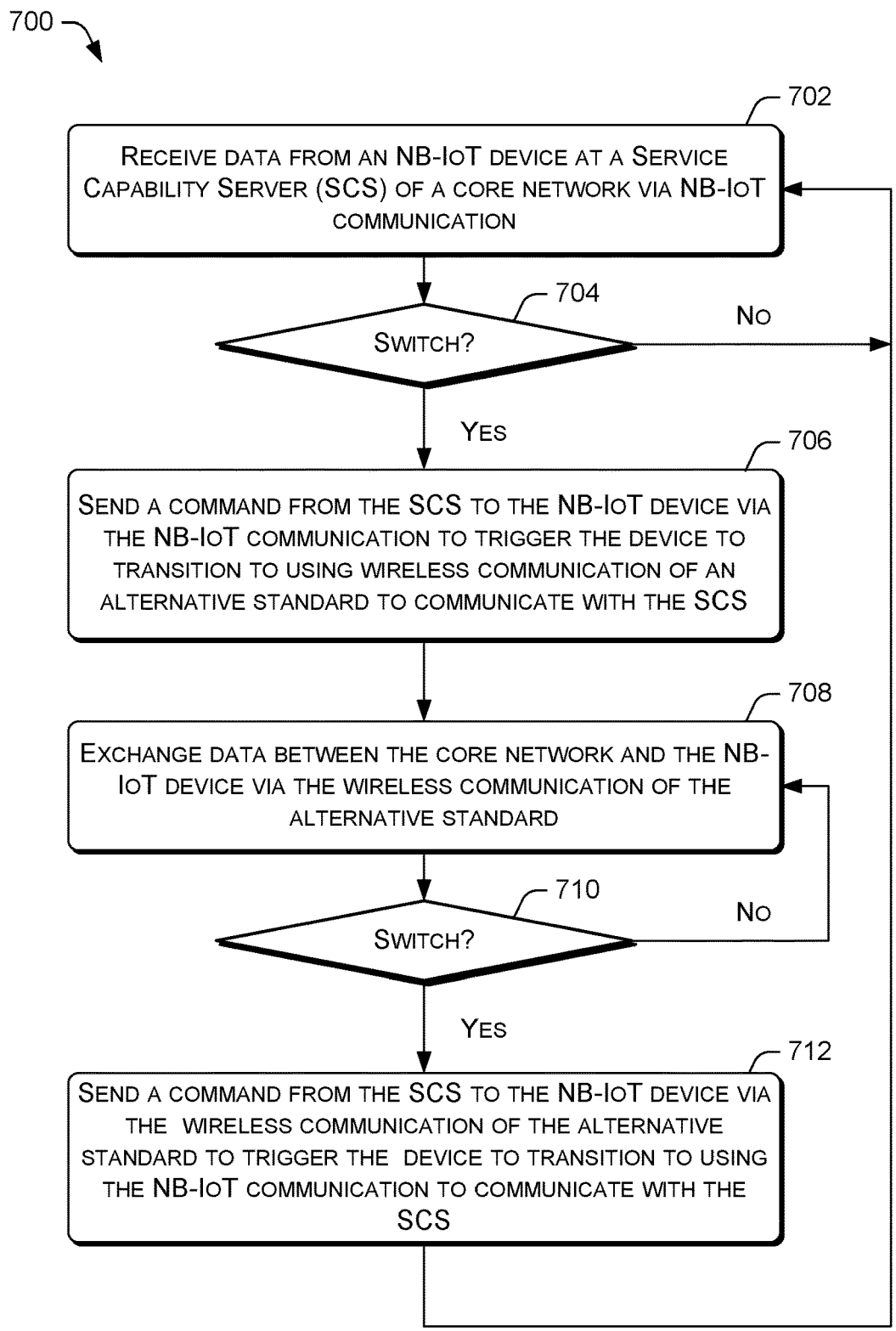
FIG. 7 is a flow diagram of an example process for switching an NB-IoT device between using NB-IoT communication and wireless communication of an alternative standard.

FIGS. 6 and 7 present illustrative processes 600 and 700 for switching an NB-IoT device between various communication connections and standards. Each of the processes 600 and 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600 and 700 are described with reference to the network architecture 100 of FIG. 1.

FIG. 6 is a flow diagram of an example process 600 for switching an NB-IoT device between using non-IP communication and IP communication to provide device management for the NB-IoT device. At block 602, the SCS 114 of the core network 104 may receive data from the NB-IoT device 106 via non-IP communication. In various embodiments, the data may be routed from the NB-IoT device 106 to the SCS 114 via the base station node 102, the MME 108, and the SCEF 112. In turn, the SCS 114 may forward the data to the application server 116. At decision block 604, the SCS 114 may determine whether the NB-IoT device 106 is to be switched to the IP communication 128. For example, the NB-IoT device 106 may be switched by the SCS 114 to the IP communication 128 so that the SCS 114 may direct the device to perform device management functions. Thus, if the SCS 114 determines that no switch to the IP communication 128 is to be performed ("no" at decision block 604), the process 600 may loop back to block 602.

However, if the SCS 114 determines that a switch to the IP communication 128 is to be performed ("yes" at decision block 604), the process 600 may proceed to block 606. At block 606, the SCS 114 may send a command to the NB-IoT device via the non-IP communication 126 to trigger the device to transition from using the non-IP communication 126 to using the IP communication 128 to communicate with the SCS 114. In various embodiments, the command may be a PDN type message specifying the use of an IP-based communication connection. The command may be transmitted via the SCEF 112 to the NB-IoT device 106. In turn, the NB-IoT device 106 may establish the IP communication 128 with the SCS 114 via the base station node 102, the MME 108, and the SPGW 110.

At block 608, the SCS 114 may use the IP communication 128 to command the NB-IoT device 106 to perform one or more device management functions. Such device management functions may include changing a network gateway (e.g., APN) setting of the NB-IoT device, changing a number of times that the device uploads data to an application server in a predetermined time period, changing a duration of a device sleep cycle, and/or so forth. In turn, the NB-IoT device 106 may send a completion notification the SCS 114 following the completion of the one or more device management functions.

At decision block 610, the SCS 114 may determine whether the NB-IoT device 106 is to be switched to non-IP communication 126. For example, the NB-IoT device 106 may be switched when the SCS 114 determines that the device has performed the requested device management functions. Thus, if the SCS 114 determines that no switch to the non-IP communication 126 is to be performed ("no" at decision block 610), the process 600 may loop back to block 608.

However, if the SCS 114 determines that a switch to the non-IP communication 126 is to be performed ("yes" at decision block 610), the process 600 may proceed to block 612. At block 612, the SCS 114 may send a command to the NB-IoT device via the IP communication 128 to trigger the device to transition from using the IP communication 128 to using the non-IP communication 126 to communicate with the SCS 114. In various embodiments, the command may be a PDN type message specifying the use of a non-IP-based communication connection. The command may be transmitted via the SPGW 110 to the NB-IoT device 106. In turn, the NB-IoT device 106 may establish the non-IP communication 126 with the SCS 114 via the base station node 102, the MME 108, and the SCEF 112. Subsequently, the process 600 may loop back to block 602.

FIG. 7 is a flow diagram of an example process 700 for switching an NB-IoT device between using NB-IoT communication and wireless communication of an alternative standard. At block 702, the SCS 114 of the core network 104 may receive data from the NB-IoT device 106 via NB-IoT communication, also referred to as the non-IP communication 126. In various embodiments, the data may be routed from the NB-IoT device 106 to the SCS 114 via the base station node 102, the MME 108, and the SCEF 112. In turn, the SCS 114 may forward the data to the application server 116. At decision block 704, the SCS 114 may determine whether the NB-IoT device 106 is to be switched to wireless communication of the alternative standard. For example, the NB-IoT device 106 may be switched by the SCS 114 to the wireless communication of the alternative standard so the NB-IoT device may exchange data with the core network 104 or perform device management functions. Thus, if the SCS 114 determines that no switch to the wireless communication of the alternative standard is to be performed ("no" at decision block 704), the process 700 may loop back to block 702.

However, if the SCS 114 determines that a switch to the wireless communication of the alternative standard is to be performed ("yes" at decision block 704), the process 600 may proceed to block 706. At block 706, the SCS 114 may send a command to the NB-IoT device via the NB-IoT communication to trigger the device to transition from using the NB-IoT communication to using the alternative standard of wireless communication to communicate with the SCS 114. In various embodiments, the command may be a PDN type message specifying the use of the wireless communication of the alternative standard. The command may be transmitted via the SCEF 112 to the NB-IoT device 106. In turn, the NB-IoT device 106 may establish the wireless communication of an alternative standard with the SCS 114 via the base station node 102, the MME 108, and the SPGW 110.

At block 708, the SCS 114 may use the wireless communication of the alternative standard to exchange data between the core network 104 and the NB-IoT device 106. For example, the data may include operating system updates, new device drivers, new application logic, new connectivity logic, and/or so forth, for the NB-IoT device 106. In other instances, the core network 104 may use the wireless communication of the alternative standard to perform device management of the NB-IoT device 106.

At decision block 710, the SCS 114 may determine whether the NB-IoT device 106 is to be switched to NB-IoT communication. For example, the NB-IoT device 106 may be switched when the SCS 114 determines that the device has finished exchanging data with the core network 104 or that the device has completed specific device management functions. Thus, if the SCS 114 determines that no switch to the NB-IoT communication is to be performed ("no" at decision block 710), the process 700 may loop back to block 708.

However, if the SCS 114 determines that a switch to NB-IoT communication is to be performed ("yes" at decision block 710), the process 700 may proceed to block 712. At block 712, the SCS 114 may send a command to the NB-IoT device via the wireless communication of the alternative standard to trigger the device to transition from using the wireless communication of the alternative standard to using the NB-IoT communication to communicate with the SCS 114. In various embodiments, the command may be a PDN type message specifying the use of the NB-IoT communication. The command may be transmitted via the SPGW 110 to the NB-IoT device 106. In turn, the NB-IoT device 106 may establish the NB-IoT communication with the SCS 114 via the base station node 102, the MME 108, and the SCEF 112. Subsequently, the process 700 may loop back to block 702.

The ability for a wireless carrier network to direct an NB-IoT device to switch between using non-IP communication and IP communication increases the operational endurance of the NB-IoT device. By switching between using non-IP communication and IP communication, the NB-IoT device may minimize battery consumption and maximize the longevity of the device components without compromising the ability of the wireless carrier network to initiate remote management of the device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving data from a NarrowBand-Internet of Things (NB-IoT) device at a Service Capability Server (SCS) of a core network in a wireless carrier network via non-Internet Protocol (IP) communication;
   determining, at the SCS, whether one or more device management functions are to be performed on the NB-IoT device;
   in response to determining at the SCS that one or more management functions are to be performed on the NB-IoT device, sending a command that triggers the NB-IoT device to using IP communication to communicate with the SCS from the SCS to a Service Capability Exposure Function (SCEF) of the core network;
   sending, from the SCEF of the core network, the command via the non-IP communication to a Mobility Management Entity (MME) of the core network for routing via a base station node of the wireless carrier network to the NB-IoT device; and
   commanding, by the SCS, the NB-IoT device to perform one or more device management functions via the IP communication.

2. The one or more non-transitory computer-readable media of claim 1, wherein the acts further comprise, sending an additional command from the SCS to the NB-IoT device via the IP communication to trigger the NB-IoT device to transition to using the non-IP communication to communicate with the SCS following completion of the one or more device management functions.

3. The one or more non-transitory computer-readable media of claim 2, where the sending the additional command includes sending the additional command to the NB-IoT device through a Servicing Gateway/PDN Gateway (SPGW).

4. The one or more non-transitory computer-readable media of claim 1, wherein the acts further comprise routing the data from the SCS to an application server.

5. The one or more non-transitory computer-readable media of claim 1, wherein the non-IP communication that includes the data from the NB-IoT device is routed from the NB-IoT device to the SCS via the base station node, the MME, and the SCEF.

6. The one or more non-transitory computer-readable media of claim 1, wherein the IP communication is routed from the NB-IoT device to the SCS via the base station node, the MME, and a Servicing Gateway/PDN Gateway (SPGW).

7. The one or more non-transitory computer-readable media of claim 1, wherein the one or more device management functions include changing a network gateway setting of the NB-IoT device, changing a number of times that the NB-IoT device uploads data to an application server in a predetermined time period, or changing a duration of a device sleep cycle.

8. The one or more non-transitory computer-readable media of claim 1, wherein the sending the command includes sending the command from the SCS to the SCEF via a Packet Data Network (PDN) type message.

9. The one or more non-transitory computer-readable media of claim 1, wherein the non-IP communication provides for transmission of the data to the SCS over a control plane of a wireless communication session without using IP defined data packet structures that include IP data packet headers, and wherein the IP communication provides data exchange using IP defined data packet structures that include IP data packet headers.

10. A Service Capability Server (SCS) in a core network of a wireless carrier network, comprising:
    one or more processors; and
    memory having instructions stored therein, the instructions, when executed by the one or more processors, cause the one or more processors to perform acts comprising:
    receiving data from a NarrowBand IoT (NB-IoT) device at the SCS in the core network via an NB-IoT communication;
    determining, at the SCS, whether one or more device management functions are to be performed on the NB-IoT device;
    in response to determining at the SCS that one or more management functions are to be performed on the NB-IoT device, sending a command that triggers the NB-IoT device to transition from using NB-IoT communication to using wireless communication of an alternative standard to communicate with the SCS from the SCS to a Service Capability Exposure Function (SCEF) of the core network;
    sending, from the SCEF of the core network, the command via the NB-IoT communication to a Mobility Management Entity (MME) of the core network for routing via a base station node of the wireless carrier network to the NB-IoT device, wherein the NB-IoT communication provides for transmission of the data to the SCS without using IP defined data packet structures that include IP data packet headers, and the wireless communication of the alternative standard provides data exchange using IP defined data packet structures that include IP data packet headers; and
    exchanging data between the core network and the NB-IoT device via the wireless communication of the alternative standard.

11. The SCS of claim 10, wherein the acts further comprise sending an additional command from the SCS to the NB-IoT device via the wireless communication of the alternative standard to trigger the NB-IoT device to transition to using the NB-IoT communication to communicate with the SCS.

12. The SCS of claim 11, wherein the sending the additional command includes sending the additional command to the NB-IoT device through a Servicing Gateway/PDN Gateway (SPGW).

13. The SCS of claim 10, wherein the NB-IoT communication that includes the data is routed from the NB-IoT device to the SCS via the base station node, the MME, and the SCEF.

14. The SCS of claim 10, wherein the wireless communication of an alternative standard includes an LTE standard communication, a 5G standard communication, 4G standard communication, a 3G standard communication, or a 2G standard communication.

15. The SCS of claim 10, wherein the wireless communication of the alternative standard is routed from the NB-IoT device to the SCS via the base station node, the MME, and a Servicing Gateway/PDN Gateway (SPGW).

16. The SCS of claim 10, wherein the NB-IoT communication provides for transmission of the data to the SCS over a control plane of a wireless communication session.

17. A computer-implemented method, comprising:
   determining, at a Service Capability Server (SCS) in a core network of a wireless carrier network, whether one or more device management functions are to be performed on a NB-IoT device;
   In response to determining at the SCS that one or more management functions are to be performed on the NB-IoT device, sending a command that triggers the NB-IoT device to transition from using the non-Internet Protocol (IP) communication to using IP communication to communicate with the SCS to a Service Capability Exposure Function (SCEF) of the core network; and
   sending, from the SCEF of the core network, the command via the non-IP communication to a Mobility Management Entity (MME) of the core network for routing via a base station node of the wireless carrier network to the NB-IoT device;
   commanding, by the SCS, the NB-IoT device to perform one or more device management functions via the IP communication; and
   sending an additional command from the SCS to the NB-IoT device via the IP communication to trigger the NB-IoT device to transition to using the non-IP communication to communicate with the SCS following completion of the one or more device management functions.

18. The computer-implemented method of claim 17, further comprising receiving data from the NB-IoT device at the SCS for routing to an application server.

19. The computer-implemented method of claim 18, wherein the non-IP communication provides for transmission of the data to the SCS over a control plane of a wireless communication session without using IP defined data packet structures that include IP data packet headers, and wherein the IP communication provides data exchange using IP defined data packet structures that include IP data packet headers.

20. The computer-implemented method of claim 17, wherein the IP communication is routed from the NB-IoT device to the SCS via a base station node, a MME, and a Servicing Gateway/PDN Gateway (SPGW).

* * * * *